(12) United States Patent
Wei et al.

(10) Patent No.: US 10,922,064 B2
(45) Date of Patent: Feb. 16, 2021

(54) METHOD, DEVICE AND USER TERMINAL FOR SOFTWARE INSTALLATION

(71) Applicant: BEIJING KINGSOFT INTERNET SECURITY SOFTWARE CO., LTD., Beijing (CN)

(72) Inventors: Zheng Wei, Beijing (CN); Chen Zhao, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 104 days.

(21) Appl. No.: 16/325,677

(22) PCT Filed: Jul. 18, 2017

(86) PCT No.: PCT/CN2017/093363
§ 371 (c)(1),
(2) Date: Feb. 14, 2019

(87) PCT Pub. No.: WO2018/006884
PCT Pub. Date: Jan. 11, 2018

(65) Prior Publication Data
US 2020/0183672 A1  Jun. 11, 2020

(30) Foreign Application Priority Data
Jul. 6, 2016  (CN) .......................... 2016 1 0528221

(51) Int. Cl.
*G06F 9/445* (2018.01)
*G06F 9/44* (2018.01)
(Continued)

(52) U.S. Cl.
CPC ................ *G06F 8/61* (2013.01); *G06F 9/445* (2013.01)

(58) Field of Classification Search
CPC ...... G06F 8/65; G06F 8/61; G06F 8/71; G06F 8/60; G06F 8/658; G06F 9/445; H04L 67/34; H04L 67/10
See application file for complete search history.

(56) References Cited

U.S. PATENT DOCUMENTS

| 10,698,671 | B2* | 6/2020 | Velasco | ...................... G06F 8/61 |
| 2013/0262845 | A1* | 10/2013 | Pearson | ...................... G06F 8/71 713/1 |
| 2014/0208303 | A1* | 7/2014 | Asayag | ................... G06F 16/21 717/170 |

FOREIGN PATENT DOCUMENTS

| CN | 102360299 A | 2/2012 |
| CN | 104111844 A | 10/2014 |
| CN | 106020917 A | 10/2016 |

OTHER PUBLICATIONS

International Search Report issued in International Application No. PCT/CN2017/093363 dated Sep. 27, 2017 (7 pages).
(Continued)

*Primary Examiner* — Thuy Dao
(74) *Attorney, Agent, or Firm* — Osha Bergman Watanabe & Burton LLP (57) ABSTRACT

Provided are a method and apparatus for software installation and a user terminal. The method includes: transmitting a software identifier of a target software to be installed to a server; acquiring software installation information corresponding to the software identifier returned by the server; analyzing the software installation information to acquire target software information and file information of a preparatory file for software installation from the software installation information; and installing the preparatory file for the software installation according to the file information and
(Continued)

installing the target software according to the target software information after the preparatory file for the software installation is installed.

19 Claims, 4 Drawing Sheets

(51) Int. Cl.
    *G06F 8/61*     (2018.01)
    *H04L 29/08*     (2006.01)
    *H04L 29/06*     (2006.01)

(56) References Cited

OTHER PUBLICATIONS

Written Opinion issued in International Application No. PCT/CN2017/093363 dated Sep. 27, 2017 (9 pages).

* cited by examiner

METHOD, DEVICE AND USER TERMINAL FOR SOFTWARE INSTALLATION

CROSS-REFERENCE TO RELATED APPLICATION

This application is a US national phase of International Application PCT/CN2017/093363, with an international filing date of Jul. 18, 2017, which claims priority to and benefits of Chinese Patent Application Serial No. 201610528221.5, filed with the State Intellectual Property Office of P. R. China by BEIJING KINGSOFT INTERNET SECURITY SOFTWARE CO., LTD. on Jul. 6, 2016 under the title of METHOD, DEVICE AND USER TERMINAL FOR SOFTWARE INSTALLATION, the entire content of which is incorporated herein by reference.

FIELD

The present disclosure relates to the field of electronic technology, and more particularly to a method and apparatus for software installation, and a user terminal.

BACKGROUND

With the development of electronic technologies and the continuous expansion of application fields, user terminals, such as mobile phones and computers, have been closely linked to people's daily work and life. In the existing user terminals, each external hardware device, such as a display card, a network card, a keyboard, a hard disk, etc., needs to install a corresponding driver to enable an operating system of the user terminal to use the external device by running the driver, and the driver can be used only when successfully installed. However, some drivers fail to be installed due to lack of specific patches in an installation process, resulting in that the hardware cannot work properly.

In the related art, when the driver fails to be installed due to lack of specific patches, a user usually needs to uninstall the driver, search, download and install the specific patches, and reinstall the driver, by which the driver can the driver be installed successfully. However, these operations are tedious and affect the installation efficiency of the driver.

SUMMARY

A first aspect of embodiments of the present disclosure provides a method for software installation, including:

transmitting a software identifier of a target software to be installed to a server;

acquiring software installation information corresponding to the software identifier returned by the server;

analyzing the software installation information to acquire target software information and file information of a preparatory file for software installation from the software installation information; and installing the preparatory file for the software installation according to the file information and installing the target software according to the target software information after the preparatory file for the software installation is installed.

Alternatively, before installing the preparatory file for the software installation according to the file information and installing the target software according to the target software information after the preparatory file for the software installation is installed, the method further includes:

acquiring a software installation package of the target software according to the target software information and acquiring a file installation package of the preparatory file for the software installation according to the file information; and adding the software installation package and the file installation package to a download-installation list.

Alternatively, installing the preparatory file for the software installation according to the file information and installing the target software according to the target software information after the preparatory file for the software installation is installed includes:

determining download-installation statuses of the software installation package and the file installation package in the download-installation list;

suspending the installation of the target software when the software installation package is in a download completion status and the file installation package is in an installation incompletion status;

installing the preparatory file for the software installation according to the file information when the file installation package is in a download completion status;

installing the target software according to the target software information when the preparatory file for the software installation is in an installation completion status, and the software installation package is in the download completion status.

Alternatively, before installing the preparatory file for the software installation according to the file information and installing the target software according to the target software information after the preparatory file for the software installation is installed, the method further includes:

determining according to the file information whether the preparatory file for the software installation is installed;

installing the preparatory file for the software installation according to the file information if the preparatory file for the software installation is not installed, and installing the target software according to the target software information after the preparatory file for the software installation is installed.

Alternatively, the method further includes:

installing the target software according to the target software information if the preparatory file for the software installation is installed.

A second aspect of embodiments of the present disclosure provides an apparatus for software installation, including:

an identifier transmitting module, configured to transmit a software identifier of a target software to be installed to a server;

an information acquiring module, configured to acquire software installation information corresponding to the software identifier returned by the server;

an information analyzing module, configured to analyze the software installation information to acquire target software information and file information of a preparatory file for software installation from the software installation information; and a first installing module, configured to install the preparatory file for the software installation according to the file information and install the target software according to the target software information after the preparatory file for the software installation is installed.

Alternatively, the apparatus further includes:

an installation package acquiring module, configured to acquire a software installation package of the target software according to the target software information and acquire a file installation package of the preparatory file for the software installation according to the file information; and an installation package adding module, configured to add the software installation package and the file installation package to a download-installation list.

Alternatively, the first installing module includes:

a status determining unit, configured to determine download-installation statuses of the software installation package and the file installation package in the download-installation list;

an installation suspending unit, configured to suspend the installation of the target software when the software installation package is in a download completion status and the file installation package is in an installation incompletion status;

a file installing unit, configured to install the preparatory file for the software installation according to the file information when the file installation package is in a download completion status;

a target software installing unit, configured to install the target software according to the target software information when the preparatory file for the software installation is in an installation completion status, and the software installation package is in the download completion status.

Alternatively, the apparatus further includes:

a software determining module, configured to determine according to the file information whether the preparatory file for the software installation is installed;

in which the first installing module is configured to install the preparatory file for the software installation according to the file information if the preparatory file for the software installation is not installed, and configured to install the target software according to the target software information after the preparatory file for the software installation is installed.

Alternatively, the apparatus further includes:

a second installing module, configured to install the target software according to the target software information if the preparatory file for the software installation is installed.

A third aspect of embodiments of the present disclosure provides a user terminal, including:

a processor, and a memory for storing executable program code;

in which the processor is configured to read the executable program code stored in the memory and run a program corresponding to the executable program code to perform the following operations:

transmitting a software identifier of a target software to be installed to a server;

acquiring software installation information corresponding to the software identifier returned by the server;

analyzing the software installation information to acquire target software information and file information of a preparatory file for software installation from the software installation information; and installing the preparatory file for the software installation according to the file information and installing the target software according to the target software information after the preparatory file for the software installation is installed.

A fourth aspect of embodiments of the present disclosure provides a storage medium, configured to store an application for performing the method for software installation according to embodiments of the first aspect of the present disclosure.

BRIEF DESCRIPTION OF THE DRAWINGS

In order to illustrate embodiments of the present disclosure or technical solutions in the related art more clearly, drawings, which are to be used in the description of embodiments of the present disclosure or the prior art, will be briefly described in the following. It will be apparent that the drawings described below are only directed to some embodiments of the present disclosure, and according to which other drawings can be obtained by those skilled in the art without inventive work.

DETAILED DESCRIPTION

In the following, technical solutions in some embodiments of the present disclosure will be clearly described with reference to accompanying drawings. Clearly, it will be understood that these embodiments are only a part of embodiments of the present disclosure, and other embodiments obtainable by those skilled in the art based on these embodiments without inventive work should belong to the protection scope of the present disclosure.

It should be illustrated that, terms used in embodiments of the present disclosure are only for the purpose of describing specific embodiments, but should not be construed to limit the present disclosure. As used in embodiments of the present disclosure and the appended claims, "a", "an" and "the" in singular forms mean including plural forms, unless clearly indicated in the context otherwise. It should also be understood that, as used herein, the term "and/or" represents and contains any one and all possible combinations of one or more associated listed items. In addition, terms "first", "second", "third" and "fourth" as used in the description of the present disclosure, the appended claims and drawings are only used for distinguishing different elements, rather than indicating a specific order. Furthermore, terms "comprising", "including", "containing" and "having" and any deformation thereof are intended to cover nonexclusive inclusions, for example, not only including a series of processes, methods, systems, products or devices of listed steps or units that are not defined in the steps or units, but also alternatively including steps or units not listed, or other steps or units inherent to these processes, methods, products or devices.

A method for software installation according to embodiments of the present disclosure may be applied to an installation scenario of a target driver, for example: transmitting a software identifier of the target driver to be installed to a server; acquiring software installation information corresponding to the software identifier returned by the server; analyzing the software installation information to acquire target driver information and file information of a preparatory file for software installation from the software installation information; installing the preparatory file for the software installation according to the file information and installing the target driver according to the target driver information after the preparatory file for the software installation is installed. In such a way, the installation of the preparatory file for the installation of the target driver is completed before the installation of the target driver, which enables the target driver also to be successfully installed, thereby improving the success rate and efficiency of the installation of the target driver.

The server involved in embodiments of the present disclosure may be a backstage supporter for serving the installation of the driver, a patch, a driver file corresponding to the driver, and an application software, etc. A user terminal involved in embodiments of the present disclosure may be any device with storage and communication functions, such as a tablet computer, a mobile phone, a personal computer (PC), a laptop, a vehicle-mounted device, a network television, etc. An apparatus for software installation involved in embodiments of the present disclosure may be any device with storage and communication functions, or a software installation module embedded in any device with storage and communication functions.

In the following, a method for software installation according to embodiments of the present disclosure will be described in detail with reference to FIGS. 1-2.

Figure 1:
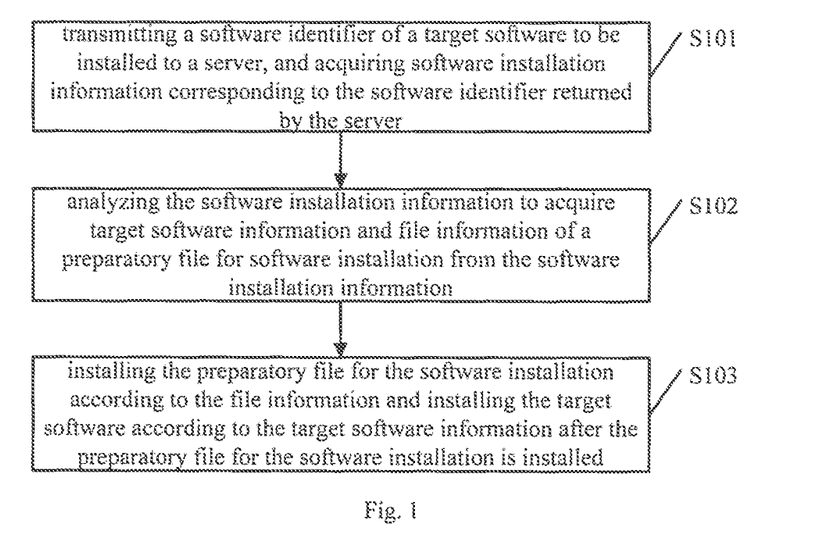
FIG. 1 is a flow chart of a method for software installation according to an embodiment of the present disclosure.

FIG. 1 is a flow chart of a method for software installation according to an embodiment of the present disclosure. As shown in FIG. 1, the method according to an embodiment of the present disclosure may include the following operations S101 to S103.

At S101, a software identifier of a target software to be installed is transmitted to a server, and software installation information corresponding to the software identifier returned by the server is acquired.

Specifically, an apparatus for software installation transmits the software identifier of the target software to be installed to the server. The target software may be a driver, such as a driver of a hard disk, a driver of a mouse, etc., or an application software, such as an instant messaging software, a shopping software, etc. The software identifier may be a software name or a software version number, for example, a driver name: realtek_rtl.exe; a version number: 2.01.

Further, after transmitting the software identifier of the target software to the server, the apparatus for software installation acquires the software installation information corresponding to the software identifier returned by the server. Specifically, after receiving the software identifier of the target software transmitted by the apparatus for software installation, the server searches the corresponding software installation information according to the software identifier. The software installation information includes target software information of the target software and file information of a preparatory file for software installation prestored by the server. In a feasible embodiment, the server marks a target software for which the preparatory file for the software installation needs to be installed, and stores the needed preparatory file for the software installation in association with the target software, so as to return the software installation information corresponding to the software identifier. In a feasible embodiment, when the software identifier of the target software to be installed received by the server is not marked, the software installation information returned by the server only includes the target software information of the target software, indicating that the target software can also be installed successfully without the installation of the preparatory file for the software installation. The preparatory file for the software installation refers to such a file that promotes the successful installation of the target software, and may include, but is not limited to, a software patch, a driver file, etc. The software patch is a mini program for correction of a problem occurred during the use of the software. The driver file is such a file that is needed in installation environment of a driver, and may be a file in a format with a filename extension of hlp, cat, inf, dll, etc. For example, the preparatory file for the software installation may be a KB2685811 patch corresponding to an Intel_TEEI driver, or a unidrv.hlp file corresponding to a printer driver.

Alternatively, the apparatus for software installation may also transmit current installation environment information to the server so as to enable the server to search more accurate file information of the preparatory file for the software installation. For example, when the current installation environment information transmitted by the apparatus for software installation to the server is Windows 64-bit system, correspondingly, the KB2685811 patch corresponding to the Intel_TEEI driver is a KB2685811 patch in a 64-bit version.

At S102, the software installation information is analyzed to acquire target software information and file information of a preparatory file for software installation from the software installation information.

Specifically, the apparatus for software installation analyzes the software installation information acquired from the server to acquire the target software information and the file information of the preparatory file for the software installation from the software installation information. The target software information may include, but is not limited to, suitable installation environment information, download address information and a software installation package of the target software, etc. The file information may include, but is not limited to, a file identifier, suitable installation environment information, download address information, a file installation package of the preparatory file for the software installation, etc. The file identifier may be a file name or a file version number of the preparatory file for the software installation, etc. The installation environment information may include, but is not limited to, version information of an operating system or a hardware identification code. The version information of the operating system may include identification information of each version of the operating system selected from UNIX, LINUX, Windows, Mac OS X, Symbian, Android, Kylin OS, etc. For example, Windows 7 64-bit indicates version information of an operating system. The hardware identifier may be represented by a hardware type, a hardware name and/or a hardware identification code. For example, the hardware identifier is represented by a hard disk identification code, and a network card identifier is represented by a Media Access Control (MAC) address, etc.

At S103, the preparatory file for the software installation is installed according to the file information, and the target software is installed according to the target software information after the preparatory file for the software installation is installed.

Specifically, the apparatus for software installation installs the preparatory file for the software installation according to the file information and installs the target software according to the target software information after the preparatory file for the software installation is installed. In a feasible embodiment, the apparatus for software installation downloads a file installation package of the preparatory file for the software installation according to download address information of the preparatory file for the software installation in the file information, and installs the preparatory file for the software installation according to the file installation package. Likewise, the apparatus for software installation downloads a software installation package of the target software according to download address information of the target software in the target software information, and installs the target software according to the software installation package after the preparatory file for the software installation is installed.

In embodiments of the present disclosure, the software identifier of the target software to be installed is transmitted to the server, so as to acquire the software installation information corresponding to the software identifier returned by the server; the software installation information is analyzed to acquire the target software information and the file information of the preparatory file for the software installation from the software installation information; the preparatory file for the software installation is installed according to the file information, after which the target software is installed according to the target software information. In such a way, the installation of the preparatory file for the software installation is completed before installing the target software, which enables the target software also to be successfully installed, thereby improving the success rate and efficiency of the installation of the target software.

Figure 2:
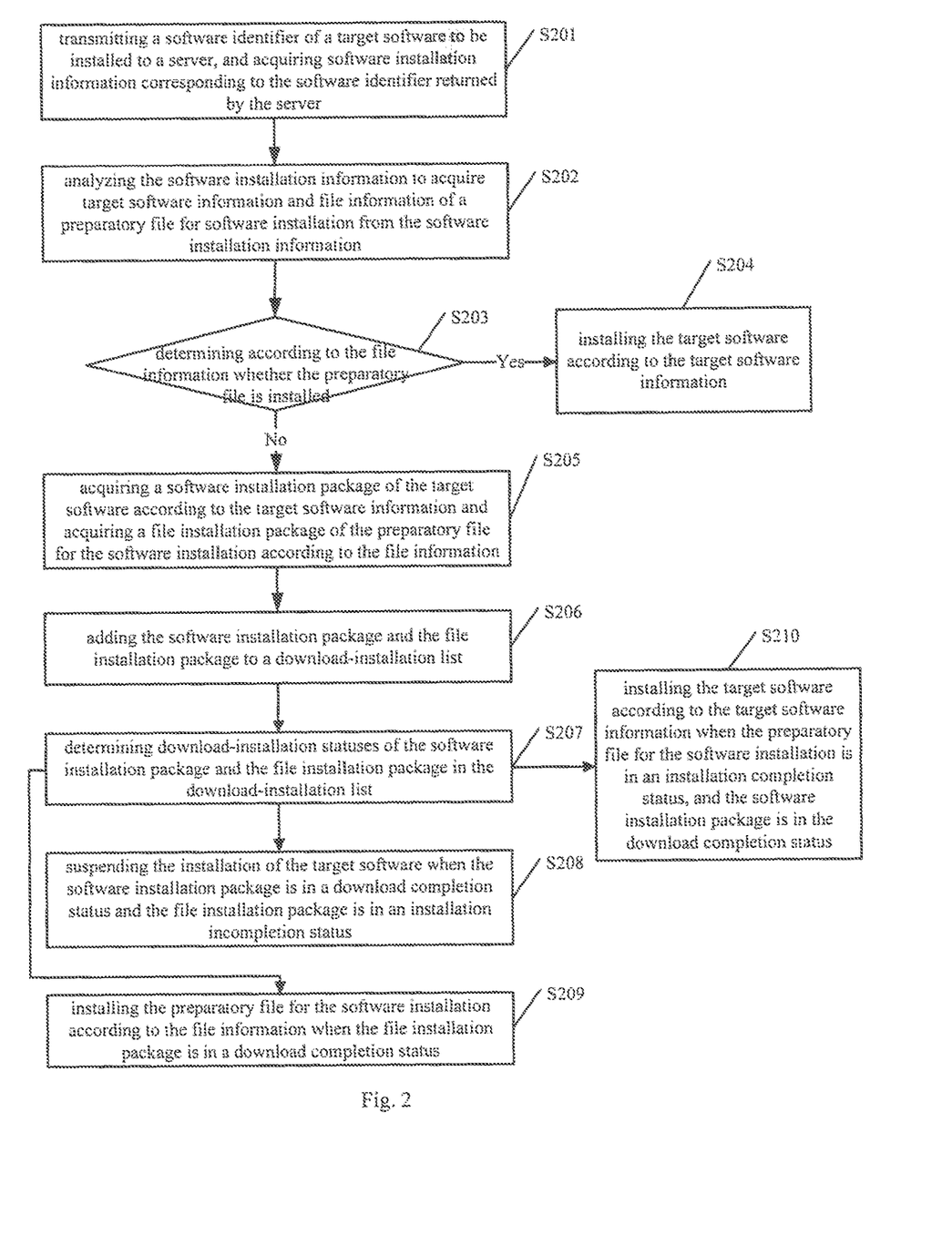
FIG. 2 is a flow chart of a method for software installation according to another embodiment of the present disclosure.

FIG. 2 is a flow chart of a method for software installation according to another embodiment of the present disclosure. As shown in FIG. 2, the method may include the following operations S201 to S210.

At S201, a software identifier of a target software to be installed is transmitted to a server, and software installation information corresponding to the software identifier returned by the server is acquired.

Specifically, the apparatus for software installation transmits the software identifier of the target software to be installed to the server. The target software may be a driver, such as a driver of a hard disk, a driver of a mouse, etc., or an application software, such as an instant messaging software, a shopping software, etc. The software identifier may be a software name or a software version number, for example, a driver name: realtek_rtl.exe; a version number: 2.01.

Further, after transmitting the software identifier of the target software to the server, the apparatus for software installation acquires the software installation information corresponding to the software identifier returned by the server. Specifically, after receiving the software identifier of the target software transmitted by the apparatus for software installation, the server searches the corresponding software installation information according to the software identifier. The software installation information includes target software information and file information of a preparatory file for software installation of the target software prestored by the server. In a feasible embodiment, the server marks a target software for which the preparatory file for the software installation needs to be installed, and stores the needed preparatory file for the software installation in association with the target software, so as to return the software installation information corresponding to the software identifier. In a feasible embodiment, when the software identifier of the target software to be installed received by the server is not marked, the software installation information returned by the server only includes the target software information of the target software, indicating that the target software can also be installed successfully without the installation of the preparatory file for the software installation. The preparatory file for the software installation refers to such a file that promotes the successful installation of the target software, and may include, but is not limited to, a software patch, a driver file, etc. The software patch is a mini program for correction of a problem occurred during the use of the software. The driver file is such a file that is needed in installation environment of a driver, and may be a file in a format with a filename extension of hip, cat, inf. dll, etc. For example, the preparatory file for the software installation may be a KB2685811 patch corresponding to an Intel_TEEI driver, or a unidrv.hlp file corresponding to a printer driver.

Alternatively, the apparatus for software installation may also transmit current installation environment information to the server so as to enable the server to search more accurate file information of the preparatory file for the software installation. For example, when the current installation environment information transmitted by the apparatus for software installation to the server is Windows 64-bit system, correspondingly, the KB2685811 patch corresponding to the Intel_TEEI driver is a KB2685811 patch in a 64-bit version.

At S202, the software installation information is analyzed to acquire target software information and file information of a preparatory file for software installation from the software installation information.

Specifically, the apparatus for software installation analyzes the software installation information acquired from the server to acquire the target software information and the file information of the preparatory file for the software installation from the software installation information. The target software information may include, but is not limited to, suitable installation environment information, download address information and a software installation package of the target software, etc. The file information may include, but is not limited to, a file identifier, suitable installation environment information, download address information, a file installation package of the preparatory file for the software installation, etc. The file identifier may be a file name or a file version number of the preparatory file for the software installation, etc. The installation environment information may include, but is not limited to, version information of an operating system or a hardware identification code. The version information of the operating system may include identification information of each version of the operating system selected from UNIX, LINUX, Windows, Mac OS X, Symbian, Android, Kylin OS, etc. For example, Windows 7 64-bit indicates version information of an operating system. The hardware identifier may be represented by a hardware type, a hardware name and/or a hardware identification code. For example, the hardware identifier is represented by a hard disk identification code, and a network card identifier is represented by an MAC address, etc.

At S203, it is determined according to the file information whether the preparatory file for the software installation is installed.

Specifically, the apparatus for software installation monitors according to the file information whether the preparatory file for the software installation is installed. Alternatively, when the file information includes the file identifier of the preparatory file for the software installation, the apparatus for software installation may determine whether the file identifier exists in installed file identifiers, if the file identifier exists in the installed file identifiers, indicating that the preparatory file for the software installation is installed; if the file identifier does exist in the installed file identifiers, indicating that the preparatory file for the software installation is not installed. When it is determined by the apparatus for software installation that the preparatory file for the software installation is installed, S204 is executed. When it is determined by the apparatus for software installation that the preparatory file for the software installation is not installed, S205 is executed.

At S204, the target software is installed according to the target software information if the preparatory file for the software installation is installed.

Specifically, if determining that the preparatory file for the software installation is installed, the apparatus for software installation installs the target software according to the target software information. Specifically, a software installation package of the target software may be downloaded according to the target software information, and the target software is installed according to the software installation package.

At S205, a software installation package of the target software is acquired according to the target software information and a file installation package of the preparatory file for the software installation is acquired according to the file information, if the preparatory file for the software installation is not installed.

Specifically, if determining that the preparatory file for the software installation is not installed, the apparatus for software installation acquires the software installation package of the target software according to the target software information and acquires the file installation package of the preparatory file for the software installation according to the file information. In a feasible embodiment, the apparatus for software installation acquires the software installation package of the target software according to download address information of the target software in the target software information, and acquires the file installation package of the preparatory file for the software installation according to download address information of the preparatory file for the software installation in the file information.

At S206, the software installation package and the file installation package are added to a download-installation list.

Specifically, the apparatus for software installation adds the acquired software installation package and file installation package to the download-installation list, so as to download the software installation package and the file installation package.

At S207, download-installation statuses of the software installation package and the file installation package in the download-installation list are determined.

Specifically, the apparatus for software installation determines the download-installation statuses of the software installation package and the file installation package in the download-installation list, based on which the apparatus for software installation may perform corresponding operations. The download-installation status may include, but is not limited to, a downloading status, a download completion status, an installation incompletion status, an installation completion status, an installation suspended status, etc. The downloading status indicates that the software installation package or the file installation package is being downloaded. The download completion status indicates that all the files of the software installation package or the file installation package are downloaded. The installation incompletion status indicates that the installation of the software installation package or the file installation package is not completed. The installation completion status indicates that the installation of the software installation package or the file installation package is completed.

At S208, the installation of the target software is suspended when the software installation package is in a download completion status and the file installation package is in an installation incompletion status.

Specifically, when the software installation package is in the download completion status and the file installation package is in the installation incompletion status, the apparatus for software installation suspends the installation of the target software. In such a way, before the installation of the file installation package is completed, the target software is not installed, or the download-installation statue of the target software may be set into an installation suspended status.

At S209, the preparatory file for the software installation is installed according to the file information when the file installation package is in a download completion status.

Specifically, when the file installation package is in the download completion status, the apparatus for software installation installs the preparatory file for the software installation according to the file information. It will be appreciated that, once the file installation package is downloaded, the apparatus for software installation performs an operation of installing the preparatory file for the software installation according to the file information. Further, alternatively, when the software installation package is in a downloading status, if the file installation package is in the download completion status, the apparatus for software installation installs the preparatory file for the software installation according to the file information. When the software installation package is in the download completion status, if the file installation package is in the download completion status, the apparatus for software installation installs the preparatory file for the software installation according to the file information and suspends the installation of the target software.

At S210, the target software is installed according to the target software information when the preparatory file for the software installation is in an installation completion status, and the software installation package is in the download completion status.

Specifically, when the preparatory file for the software installation is in the installation completion status, and the software installation package is in the download completion status, the apparatus for software installation installs the target software according to the target software information.

In embodiments of the present disclosure, the software identifier of the target software to be installed is transmitted to the server, so as to acquire the software installation information corresponding to the software identifier returned by the server; the software installation information is analyzed to acquire the target software information and the file information of the preparatory file for the software installation from the software installation information; the preparatory file for the software installation is installed according to the file information, after which the target software is installed according to the target software information. In such a way, the installation of the preparatory file for the software installation is completed before installing the target software, which enables the target software also to be successfully installed, thereby improving the success rate and efficiency of the installation of the target software.

Figure 3:
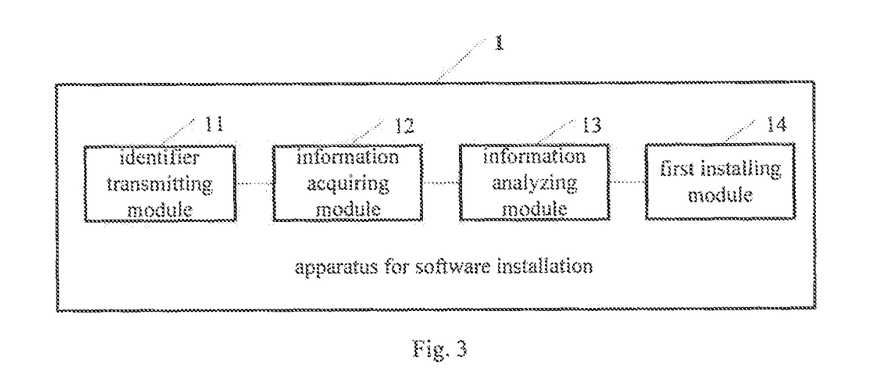
FIG. 3 is a schematic diagram of an apparatus for software installation according to an embodiment of the present disclosure.

FIG. 3 is a schematic diagram of an apparatus for software installation according to an embodiment of the present disclosure. As shown in FIG. 3, the apparatus 1 for software installation according to an embodiment of the present disclosure may include an identifier transmitting module 11, an information acquiring module 12, an information analyzing module 13, and a first installing module 14.

The identifier transmitting module 11 is configured to transmit a software identifier of a target software to be installed to a server.

In a specific implementation, the identifier transmitting module 11 transmits the software identifier of the target software to be installed to the server. The target software may be a driver, such as a driver of a hard disk, a driver of a mouse, etc., or an application software, such as an instant messaging software, a shopping software, etc. The software identifier may be a software name or a software version number, etc., for example, a driver name: realtek_rtl.exe; a version number: 2.01.

The information acquiring module 12 is configured to acquire software installation information corresponding to the software identifier returned by the server.

In a specific implementation, after the identifier transmitting module 11 transmits the software identifier of the target software to be installed to the server, the information acquiring module 12 acquires the software installation information corresponding to the software identifier returned by the server. After receiving the software identifier of the target software transmitted by the apparatus for software installation, the server searches the corresponding software installation information according to the software identifier. The software installation information includes target software information and file information of a preparatory file for software installation of the target software prestored by the server. In a feasible embodiment, the server marks a target software for which the preparatory file for the software installation needs to be installed, and stores the needed preparatory file for the software installation in association with the target software, so as to return the software installation information corresponding to the software identifier. In a feasible embodiment, when the software identifier of the target software to be installed received by the server is not marked, the software installation information returned by the server only includes the target software information of the target software, indicating that the target software can also be installed successfully without the installation of the preparatory file for the software installation. The preparatory file for the software installation refers to such a file that promotes the successful installation of the target software, and may include, but is not limited to, a software patch, a driver file, etc. The software patch is a mini program for correction of a problem occurred during the use of the software. The driver file is such a file that is needed in installation environment of a driver, and may be a file in a format with a filename extension of hip, cat, inf, dll, etc. For example, the preparatory file for the software installation may be a KB2685811 patch corresponding to an Intel_TEEI driver, or a unidrv.hlp file corresponding to a printer driver.

Alternatively, the apparatus 1 for software installation may also transmit current installation environment information to the server so as to enable the server to search more accurate file information of the preparatory file for the software installation. For example, when the current installation environment information transmitted by the apparatus for software installation to the server is Windows 64-bit system, correspondingly, the KB2685811 patch corresponding to the Intel_TEEI driver is a KB2685811 patch in a 64-bit version.

The information analyzing module 13 is configured to analyze the software installation information to acquire target software information and file information of a preparatory file for software installation from the software installation information.

In a specific implementation, the information analyzing module 13 analyzes the software installation information acquired from the server to acquire the target software information and the file information of the preparatory file for the software installation from the software installation information. The target software information may include, but is not limited to, suitable installation environment information, download address information and a software installation package of the target software, etc. The file information may include, but is not limited to, a file identifier, suitable installation environment information, download address information, a file installation package of the preparatory file for the software installation, etc. The file identifier may be a file name or a file version number of the preparatory file for the software installation, etc. The installation environment information may include, but is not limited to, version information of an operating system or a hardware identification code. The version information of the operating system may include identification information of each version of the operating system selected from UNIX, LINUX, Windows, Mac OS X, Symbian, Android, Kylin OS, etc. For example, Windows 7 64-bit indicates version information of an operating system. The hardware identifier may be represented by a hardware type, a hardware name and/or a hardware identification code. For example, the hardware identifier is represented by a hard disk identification code, and a network card identifier is represented by an MAC address, etc.

The first installing module 14 is configured to install the preparatory file for the software installation according to the file information and install the target software according to the target software information after the preparatory file for the software installation is installed.

In a specific implementation, the first installing module 14 installs the preparatory file for the software installation according to the file information, and installs the target software according to the target software information after the preparatory file for the software installation is installed. In a feasible embodiment, the apparatus 1 for software installation downloads a file installation package of the preparatory file for the software installation according to download address information of the preparatory file for the software installation in the file information, and installs the preparatory file for the software installation according to the file installation package. Likewise, the apparatus 1 for software installation downloads a software installation package of the target software according to download address information of the target software in the target software information, and installs the target software according to the software installation package after the preparatory file for the software installation is installed.

In embodiments of the present disclosure, the software identifier of the target software to be installed is transmitted to the server, so as to acquire the software installation information corresponding to the software identifier returned by the server; the software installation information is analyzed to acquire the target software information and the file information of the preparatory file for the software installation from the software installation information; the preparatory file for the software installation is installed according to the file information, after which the target software is installed according to the target software information. In such a way, the installation of the preparatory file for the software installation is completed before installing the target software, which enables the target software also to be successfully installed, thereby improving the success rate and efficiency of the installation of the target software.

Figure 4:
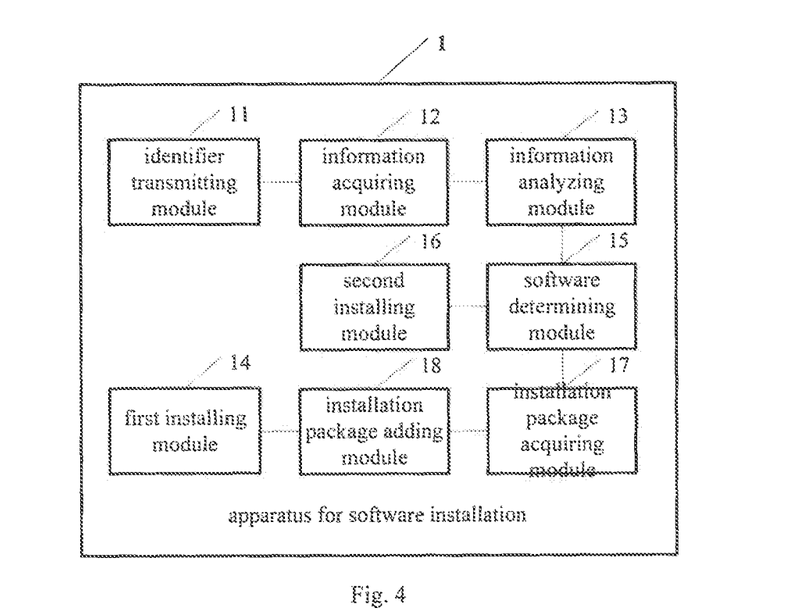
FIG. 4 is a schematic diagram of an apparatus for software installation according to another embodiment of the present disclosure.

FIG. 4 is a schematic diagram of an apparatus for software installation according to another embodiment of the present disclosure. As shown in FIG. 4, the apparatus 1 for software installation may include: an identifier transmitting module 11, an information acquiring module 12, an information analyzing module 13, a first installing module 14, a software determining module 15, a second installing module 16, an installation package acquiring module 17, and an installation package adding module 18.

The identifier transmitting module 11 is configured to transmit a software identifier of a target software to be installed to a server.

In a specific implementation, the identifier transmitting module 11 transmits the software identifier of the target software to be installed to the server. The target software may be a driver, such as a driver of a hard disk, a driver of a mouse, etc., or an application software, such as an instant messaging software, a shopping software, etc. The software identifier may be a software name or a software version number, etc., for example, a driver name: realtek_rtl.exe; a version number: 2.01.

The information acquiring module 12 is configured to acquire software installation information corresponding to the software identifier returned by the server.

In a specific implementation, after the identifier transmitting module 11 transmits the software identifier of the target software to be installed to the server, the information acquiring module 12 acquires the software installation information corresponding to the software identifier returned by the server. After receiving the software identifier of the target software transmitted by the apparatus for software installation, the server searches the corresponding software installation information according to the software identifier. The software installation information includes target software information and file information of a preparatory file for software installation of the target software prestored by the server. In a feasible embodiment, the server marks a target software for which the preparatory file for the software installation needs to be installed, and stores the needed preparatory file for the software installation in association with the target software, so as to return the software installation information corresponding to the software identifier. In a feasible embodiment, when the software identifier of the target software to be installed received by the server is not marked, the software installation information returned by the server only includes the target software information of the target software, indicating that the target software can also be installed successfully without the installation of the preparatory file for the software installation. The preparatory file for the software installation refers to such a file that promotes the successful installation of the target software, and may include, but is not limited to, a software patch, a driver file, etc. The software patch is a mini program for correction of a problem occurred during the use of the software. The driver file is such a file that is needed in installation environment of a driver, and may be a file in a format with a filename extension of hip, cat, inf, dll, etc. For example, the preparatory file for the software installation may be a KB2685811 patch corresponding to an Intel_TEEI driver, or a unidrv.hlp file corresponding to a printer driver.

Alternatively, the apparatus 1 for software installation may also transmit current installation environment information to the server so as to enable the server to search more accurate file information of the preparatory file for the software installation. For example, when the current installation environment information transmitted by the apparatus for software installation to the server is Windows 64-bit system, correspondingly, the KB2685811 patch corresponding to the Intel_TEEI driver is a KB2685811 patch in a 64-bit version.

The information analyzing module 13 is configured to analyze the software installation information to acquire target software information and file information of a preparatory file for software installation from the software installation information.

In a specific implementation, the information analyzing module 13 analyzes the software installation information acquired from the server to acquire the target software information and the file information of the preparatory file for the software installation from the software installation information. The target software information may include, but is not limited to, suitable installation environment information, download address information and a software installation package of the target software, etc. The file information may include, but is not limited to, a file identifier, suitable installation environment information, download address information, a file installation package of the preparatory file for the software installation, etc. The file identifier may be a file name or a file version number of the preparatory file for the software installation, etc. The installation environment information may include, but is not limited to, version information of an operating system or a hardware identification code. The version information of the operating system may include identification information of each version of the operating system selected from UNIX, LINUX, Windows, Mac OS X, Symbian, Android, Kylin OS, etc. For example, Windows 7 64-bit indicates version information of an operating system. The hardware identifier may be represented by a hardware type, a hardware name and/or a hardware identification code. For example, the hardware identifier is represented by a hard disk identification code, and a network card identifier is represented by an MAC address, etc.

The software determining module 15 is configured to determine according to the file information whether the preparatory file for the software installation is installed.

In a specific implementation, the software determining module 15 monitors according to the file information whether the preparatory file for the software installation is installed. Alternatively, when the file information includes the file identifier of the preparatory file for the software installation, the software determining module 15 may determine whether the file identifier exists in installed file identifiers, if the file identifier exists in the installed file identifiers, indicating that the preparatory file for the software installation is installed; if the file identifier does exist in the installed file identifiers, indicating that the preparatory file for the software installation is not installed. When the software determining module 15 determines that the preparatory file for the software installation is installed, the second installing module 16 operates. When it is determined by the apparatus for software installation that the preparatory file for the software installation is not installed, the installation package acquiring module 17 operates.

The second installing module 16 is configured to install the target software according to the target software information if the preparatory file for the software installation is installed.

In a specific implementation, if the software determining module 15 determines that the preparatory file for the software installation is installed, the second installing module 16 installs the target software according to the target software information. Specifically, a software installation package of the target software may be downloaded according to the target software information, and the target software is installed according to the software installation package.

The installation package acquiring module 17 is configured to acquire a software installation package of the target software according to the target software information and acquire a file installation package of the preparatory file for the software installation according to the file information.

In a specific implementation, if the software determining module 15 determines that the preparatory file for the software installation is not installed, the installation package acquiring module 17 acquires the software installation package of the target software according to the target software information and acquires the file installation package of the preparatory file for the software installation according to the file information. In a feasible embodiment, the installation package acquiring module 17 acquires the software installation package of the target software according to download address information of the target software in the target software information, and acquires the file installation package of the preparatory file for the software installation according to download address information of the preparatory file for the software installation in the file information.

The installation package adding module 18 is configured to add the software installation package and the file installation package to a download-installation list.

In a specific implementation, the installation package adding module 18 adds the acquired software installation package and file installation package to the download-installation list, so as to download the software installation package and the file installation package.

The first installing module 14 is configured to install the preparatory file for the software installation according to the file information and install the target software according to the target software information after the preparatory file for the software installation is installed.

Figure 5:
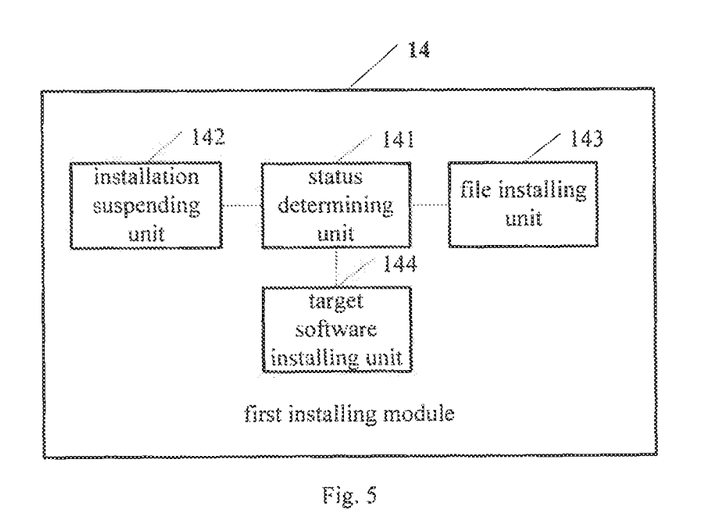
FIG. 5 is a schematic diagram of a first installing module according to an embodiment of the present disclosure.

FIG. 5 is a schematic diagram of a first installing module according to an embodiment of the present disclosure. Further referring to FIG. 5, the first installing module 14 includes: a status determining unit 141, an installation suspending unit 142, a file installing unit 143 and a target software installing unit 144.

The status determining unit 141 is configured to determine the download-installation statuses of the software installation package and the file installation package in the download-installation list.

In a specific implementation, the status determining unit 141 determines the download-installation statuses of the software installation package and the file installation package in the download-installation list, based on which the apparatus 1 for software installation may perform corresponding operations. The download-installation status may include, but is not limited to, a downloading status, a download completion status, an installation incompletion status, an installation completion status, an installation suspended status, etc. The downloading status indicates that the software installation package or the file installation package is being downloaded. The download completion status indicates that all the files of the software installation package or the file installation package are downloaded. The installation incompletion status indicates that the installation of the software installation package or the file installation package is not completed. The installation completion status indicates that the installation of the software installation package or the file installation package is completed.

The installation suspending unit 142 is configured to suspend the installation of the target software when the software installation package is in a download completion status and the file installation package is in an installation incompletion status.

In a specific implementation, when the software installation package is in the download completion status and the file installation package is in the installation incompletion status, the installation suspending unit 142 suspends the installation of the target software. In such a way, before the installation of the file installation package is completed, the target software is not installed, or the download-installation statue of the target software may be set into an installation suspended status.

The file installing unit 143 is configured to install the preparatory file for the software installation according to the file information when the file installation package is in a download completion status.

In a specific implementation, when the file installation package is in the download completion status, the file installing unit 143 installs the preparatory file for the software installation according to the file information. It will be appreciated that, once the file installation package is downloaded, the file installing unit 143 performs an operation of installing the preparatory file for the software installation according to the file information. Further, alternatively, when the software installation package is in a downloading status, if the file installation package is in the download completion status, the file installing unit 143 installs the preparatory file for the software installation according to the file information. When the software installation package is in the download completion status, if the file installation package is in the download completion status, the file installing unit 143 installs the preparatory file for the software installation according to the file information, and at this time, the apparatus for software installation suspends the installation of the target software.

The target software installing unit 144 is configured to install the target software according to the target software information when the preparatory file for the software installation is in an installation completion status, and the software installation package is in the download completion status.

In a specific implementation, when the preparatory file for the software installation is in the installation completion status, and the software installation package is in the download completion status, the target software installing unit 144 installs the target software according to the target software information.

In embodiments of the present disclosure, the software identifier of the target software to be installed is transmitted to the server, so as to acquire the software installation information corresponding to the software identifier returned by the server; the software installation information is analyzed to acquire the target software information and the file information of the preparatory file for the software installation from the software installation information; the preparatory file for the software installation is installed according to the file information, after which the target software is installed according to the target software information. In such a way, the installation of the preparatory file for the software installation is completed before installing the target software, which enables the target software also to be successfully installed, thereby improving the success rate and efficiency of the installation of the target software.

Figure 6:
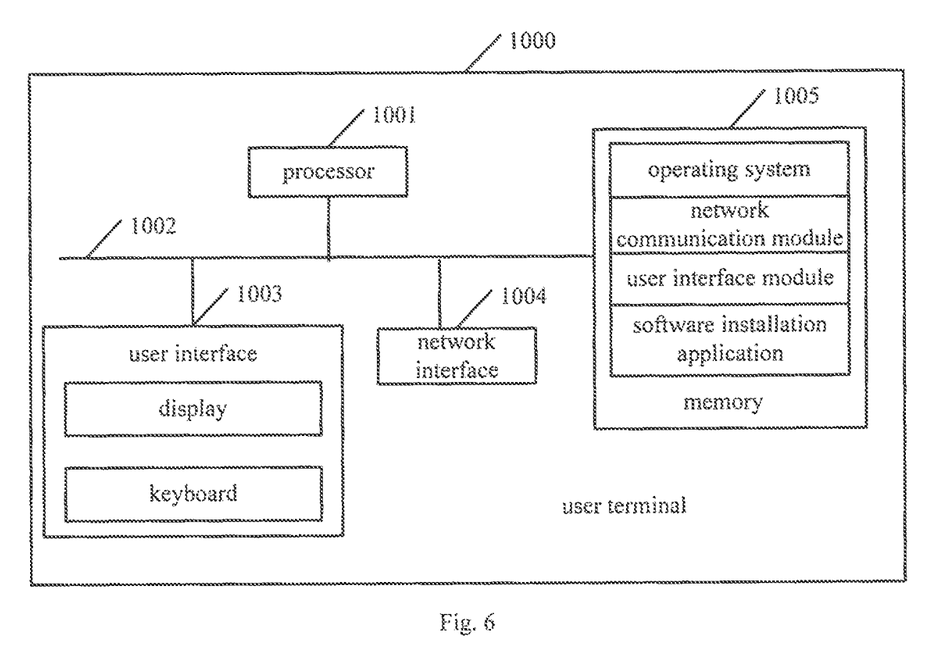
FIG. 6 is a schematic diagram of a user terminal according to an embodiment of the present disclosure.

FIG. 6 is a schematic diagram of a user terminal according to an embodiment of the present disclosure. As shown in FIG. 6, the user terminal 1000 may include: at least one processor 1001, such as a Central Processing Unit (CPU), at least one network interface 1004, a user interface 1003, a memory 1005, and at least one communication bus 1002. The communication bus 1002 is configured to achieve connections and communications among these components. The user interface 1003 may include a display, a keyboard, and optionally include a standard wired interface or wireless interface. The network interface 1004 may optionally include a standard wired interface or wireless interface (such as a WI-FI interface). The memory 1005 may be a high-speed RAM memory or a non-volatile memory, such as at least one disk memory, and optionally may also be at least one storage device located far from the above-mentioned processor 1001. As shown in FIG. 6, as a computer storage medium, the memory 1005 may include an operating system, a network communication module, a user interface module and a software installation application.

In the user terminal 1000 as shown in FIG. 6, the user interface 1003 is mainly configured to receive software installation information transmitted by a server, the processor 1001 may be configured to call the software installation application stored in the memory 1005, and specifically execute the following operations:

transmitting a software identifier of a target software to be installed to a server;

acquiring software installation information corresponding to the software identifier returned by the server;

analyzing the software installation information to acquire target software information and file information of a preparatory file for software installation from the software installation information; and installing the preparatory file for the software installation according to the file information and installing the target software according to the target software information after the preparatory file for the software installation is installed.

In an embodiment of the present disclosure, before executing the operations of installing the preparatory file for the software installation according to the file information and installing the target software according to the target software information after the preparatory file for the software installation is installed, the processor 1001 further executes the following operations:

acquiring a software installation package of the target software according to the target software information and acquiring a file installation package of the preparatory file for the software installation according to the file information; and adding the software installation package and the file installation package to a download-installation list.

In an embodiment, the processor 1001 executes the operations of installing the preparatory file for the software installation according to the file information and installing the target software according to the target software information after the preparatory file for the software installation is installed by:

determining download-installation statuses of the software installation package and the file installation package in the download-installation list;

suspending the installation of the target software when the software installation package is in a download completion status and the file installation package is in an installation incompletion status;

installing the preparatory file for the software installation according to the file information when the file installation package is in a download completion status;

installing the target software according to the target software information when the preparatory file for the software installation is in an installation completion status, and the software installation package is in the download completion status.

In an embodiment, before executing the operations of installing the preparatory file for the software installation according to the file information and installing the target software according to the target software information after the preparatory file for the software installation is installed, the processor 1001 further executes the following operations:

determining according to the file information whether the preparatory file for the software installation is installed; and installing the preparatory file for the software installation according to the file information if the preparatory file for the software installation is not installed, and installing the target software according to the target software information after the preparatory file for the software installation is installed.

In an embodiment, the processor 1001 further executes the following operation:

installing the target software according to the target software information if the preparatory file for the software installation is installed.

In embodiments of the present disclosure, the software identifier of the target software to be installed is transmitted to the server, so as to acquire the software installation information corresponding to the software identifier returned by the server; the software installation information is analyzed to acquire the target software information and the file information of the preparatory file for the software installation from the software installation information; the preparatory file for the software installation is installed according to the file information, after which the target software is installed according to the target software information. In such a way, the installation of the preparatory file for the software installation is completed before installing the target software, which enables the target software also to be successfully installed, thereby improving the success rate and efficiency of the installation of the target software.

The modules or units in embodiments of the present disclosure may be realized by a universal integrated circuit such as CPU, or an Application Specific Integrated Circuit (ASIC).

Embodiments of the present disclosure further provide a storage medium, configured to store an application for performing the method for software installation as described in the above embodiments.

Operations as described in the method according to embodiments of the present disclosure may be adjusted, combined or deleted as required.

The modules or units in the terminal according to embodiments of the present disclosure may be combined, divided or deleted as required.

It can be understood by those with ordinary skill in the art that all or part of the operations in the method as described in above embodiments may be implemented by instructing related hardware via computer programs, the program may be stored in a computer readable storage medium, and the program, when executed, may include the operations of the method as described in above embodiments. The storage medium may include a magnetic disk, an optical disk, a Read-Only Memory (ROM) or a Random Access Memory (RAM), etc.

The above descriptions are only explanatory embodiments of the present disclosure, and certainly shall not be construed to limit the scope of the present disclosure. Therefore, equivalent changes made according to the claims of the present disclosure still belong to the scope of the present disclosure.

The above descriptions are only explanatory embodiments of the present disclosure, and certainly shall not be construed to limit the scope of the present disclosure.

Therefore, equivalent changes made according to the claims of the present disclosure still belong to the scope of the present disclosure.

What is claimed is:

1. A method for software installation, comprising:
transmitting a software identifier of a target software to be installed to a server;
acquiring software installation information corresponding to the software identifier returned by the server;
analyzing the software installation information to acquire target software information and file information of a preparatory file for software installation from the software installation information; and
installing the preparatory file for the software installation according to the file information and installing the target software according to the target software information after the preparatory file for the software installation is installed.

2. The method according to claim 1, wherein before installing the preparatory file for the software installation according to the file information and installing the target software according to the target software information after the preparatory file for the software installation is installed, the method further comprises:
acquiring a software installation package of the target software according to the target software information and acquiring a file installation package of the preparatory file for the software installation according to the file information; and
adding the software installation package and the file installation package to a download-installation list.

3. The method according to claim 2, wherein installing the preparatory file for the software installation according to the file information and installing the target software according to the target software information after the preparatory file for the software installation is installed comprises:
determining download-installation statuses of the software installation package and the file installation package in the download-installation list;
suspending the installation of the target software when the software installation package is in a download completion status and the file installation package is in an installation incompletion status;
installing the preparatory file for the software installation according to the file information when the file installation package is in a download completion status;
installing the target software according to the target software information when the preparatory file for the software installation is in an installation completion status, and the software installation package is in the download completion status.

4. The method according to claim 3, wherein before installing the preparatory file for the software installation according to the file information and installing the target software according to the target software information after the preparatory file for the software installation is installed, the method further comprises:
determining according to the file information whether the preparatory file for the software installation is installed;
installing the preparatory file for the software installation according to the file information if the preparatory file for the software installation is not installed, and installing the target software according to the target software information after the preparatory file for the software installation is installed.

5. The method according to claim 4, further comprising:
installing the target software according to the target software information if the preparatory file for the software installation is installed.

6. The method according to claim 2, wherein before installing the preparatory file for the software installation according to the file information and installing the target software according to the target software information after the preparatory file for the software installation is installed, the method further comprises:
determining according to the file information whether the preparatory file for the software installation is installed;
installing the preparatory file for the software installation according to the file information if the preparatory file for the software installation is not installed, and installing the target software according to the target software information after the preparatory file for the software installation is installed.

7. The method according to claim 6, further comprising:
installing the target software according to the target software information if the preparatory file for the software installation is installed.

8. The method according to claim 1, wherein before installing the preparatory file for the software installation according to the file information and installing the target software according to the target software information after the preparatory file for the software installation is installed, the method further comprises:
determining according to the file information whether the preparatory file for the software installation is installed;
installing the preparatory file for the software installation according to the file information if the preparatory file for the software installation is not installed, and installing the target software according to the target software information after the preparatory file for the software installation is installed.

9. The method according to claim 4, further comprising:
installing the target software according to the target software information if the preparatory file for the software installation is installed.

10. A user terminal, comprising:
a processor; and
a memory for storing executable program code;
wherein the processor is configured to read the executable program code stored in the memory and run a program corresponding to the executable program code to perform the following operations:
transmitting a software identifier of a target software to be installed to a server;
acquiring software installation information corresponding to the software identifier returned by the server;
analyzing the software installation information to acquire target software information and file information of a preparatory file for software installation from the software installation information; and
installing the preparatory file for the software installation according to the file information and installing the target software according to the target software information after the preparatory file for the software installation is installed.

11. The user terminal according to claim 10, wherein before installing the preparatory file for the software installation according to the file information and installing the target software according to the target software information after the preparatory file for the software installation is installed, the processor is configured to further perform the following operations:

acquiring a software installation package of the target software according to the target software information and acquiring a file installation package of the preparatory file for the software installation according to the file information; and adding the software installation package and the file installation package to a download-installation list.

12. The user terminal according to claim 11, wherein the processor performs the operation of installing the preparatory file for the software installation according to the file information and installing the target software according to the target software information after the preparatory file for the software installation is installed by:

determining download-installation statuses of the software installation package and the file installation package in the download-installation list;

suspending the installation of the target software when the software installation package is in a download completion status and the file installation package is in an installation incompletion status;

installing the preparatory file for the software installation according to the file information when the file installation package is in a download completion status;

installing the target software according to the target software information when the preparatory file for the software installation is in an installation completion status, and the software installation package is in the download completion status.

13. The user terminal according to claim 10, wherein before installing the preparatory file for the software installation according to the file information and installing the target software according to the target software information after the preparatory file for the software installation is installed, the processor is configured to further perform following operations:

determining according to the file information whether the preparatory file for the software installation is installed;

installing the preparatory file for the software installation according to the file information if the preparatory file for the software installation is not installed, and installing the target software according to the target software information after the preparatory file for the software installation is installed.

14. The user terminal according to claim 13, wherein the processor is configured to further perform a following operation:

installing the target software according to the target software information if the preparatory file for the software installation is installed.

15. A non-transitory computer readable storage medium, configured to store an application for performing a method for software installation, the method comprising:

transmitting a software identifier of a target software to be installed to a server;

acquiring software installation information corresponding to the software identifier returned by the server;

analyzing the software installation information to acquire target software information and file information of a preparatory file for software installation from the software installation information; and installing the preparatory file for the software installation according to the file information and installing the target software according to the target software information after the preparatory file for the software installation is installed.

16. The non-transitory computer readable storage medium according to claim 15, wherein before installing the preparatory file for the software installation according to the file information and installing the target software according to the target software information after the preparatory file for the software installation is installed, the method further comprises:

acquiring a software installation package of the target software according to the target software information and acquiring a file installation package of the preparatory file for the software installation according to the file information; and adding the software installation package and the file installation package to a download- installation list.

17. The non-transitory computer readable storage medium according to claim 16, wherein installing the preparatory file for the software installation according to the file information and installing the target software according to the target software information after the preparatory file for the software installation is installed comprises:

determining download-installation statuses of the software installation package and the file installation package in the download-installation list;

suspending the installation of the target software when the software installation package is in a download completion status and the file installation package is in an installation incompletion status;

installing the preparatory file for the software installation according to the file information when the file installation package is in a download completion status;

installing the target software according to the target software information when the preparatory file for the software installation is in an installation completion status, and the software installation package is in the download completion status.

18. The non-transitory computer readable storage medium according to claim 15, wherein before installing the preparatory file for the software installation according to the file information and installing the target software according to the target software information after the preparatory file for the software installation is installed, the method further comprises:

determining according to the file information whether the preparatory file for the software installation is installed;

installing the preparatory file for the software installation according to the file information if the preparatory file for the software installation is not installed, and installing the target software according to the target software information after the preparatory file for the software installation is installed.

19. The non-transitory computer readable storage medium according to claim 18, wherein the method further comprises:

installing the target software according to the target software information if the preparatory file for the software installation is installed.

\* \* \* \* \*